United States Patent
Shen et al.

(10) Patent No.: US 10,552,712 B2
(45) Date of Patent: Feb. 4, 2020

(54) TRAINING DEVICE AND TRAINING METHOD FOR TRAINING IMAGE PROCESSING DEVICE

(71) Applicant: Fujitsu Limited, Kawasaki-shi, Kanagawa (JP)

(72) Inventors: Wei Shen, Beijing (CN); Rujie Liu, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 85 days.

(21) Appl. No.: 15/843,719

(22) Filed: Dec. 15, 2017

(65) Prior Publication Data
US 2018/0173997 A1    Jun. 21, 2018

(30) Foreign Application Priority Data
Dec. 15, 2016  (CN) .......................... 2016 1 1160001

(51) Int. Cl.
| | |
|---|---|
| G06K 9/62 | (2006.01) |
| G06N 3/08 | (2006.01) |
| G06K 9/00 | (2006.01) |
| G06N 3/04 | (2006.01) |

(52) U.S. Cl.
CPC ....... G06K 9/6256 (2013.01); G06K 9/00281 (2013.01); G06K 9/628 (2013.01); G06K 9/6227 (2013.01); G06K 9/6262 (2013.01); G06N 3/0454 (2013.01); G06N 3/088 (2013.01)

(58) Field of Classification Search
CPC ......... G06T 2207/20084; G06T 3/4046; G06T 7/73; G06T 7/33; G06T 2207/20081; G06T 2207/30196; G06K 9/6262
See application file for complete search history.

(56) References Cited

U.S. PATENT DOCUMENTS

| | | | | |
|---|---|---|---|---|
| 2017/0046613 A1* | 2/2017 | Paluri | ................. | G06N 3/0454 |
| 2018/0075581 A1* | 3/2018 | Shi | ........................ | G06T 3/4053 |
| 2018/0122048 A1* | 5/2018 | Wang | .................... | G06T 3/4053 |

(Continued)

OTHER PUBLICATIONS

Liu et al., "Coupled Generative Adversarial Networks," Sep. 20, 2016. Cited on the IDS filed May 10, 2018. (Year: 2016).*

(Continued)

*Primary Examiner* — Ross Varndell
(74) *Attorney, Agent, or Firm* — Staas & Halsey LLP

(57) ABSTRACT

The disclosure relates to a training device and method for an image processing device and an image processing device. The training device is used for training first and second image processing units, comprising: a training unit to input a first realistic image without a specific feature into the first image processing unit to generate a first generated image with the specific feature through first image processing, and to input a second realistic image with the specific feature into the second image processing unit to generate a second generated image without the specific feature through second image processing; and a classifying unit performing classification processing to discriminate realistic and generated images, wherein the training unit performs first training processing of training the classifying unit based on the realistic and generated images, and performs second training processing of training the first and second image processing units based on the training result.

9 Claims, 5 Drawing Sheets

(56) References Cited

U.S. PATENT DOCUMENTS

2018/0173955 A1\* 6/2018 Mehrseresht ...... G06K 9/00718
2019/0080205 A1\* 3/2019 Kaufhold ............ G06K 9/6257

OTHER PUBLICATIONS

Extended European Search Report in Application No. 17207408.0 dated May 2, 2018 (13 pages).
29th Conference on Neural Information Processing Systems (NIPS 2016), Barcelona, Spain, Article: "Coupled Generative Adversarial Networks", Ming-Yu Liu et al., arXiv:1606.07536v2 [cs.CV] Sep. 20, 2016, pp. 1-32 (32 pages).
Website pages, Microsoft Support, Article: "iSee: Using deep learning to remove eyeglasses from faces", Melissa Runfeldt, Nov. 12, 2016, https://blog.insightdatascience.com/isee-removing-eyeglasses-from-faces-using-deep-learning-d4e7d935376f, pp. 1-11 (11 pages).
"Generative Adversarial Nets", Ian J. Goodfellow et al., Department d'informatique et de recherché opérationnelle, Université de Montréal, Montréal, QC H3C 3J7, arXiv:1406.2661v1 [stat.ML] Jun. 10, 2014 pp. 1-9 (9 pages).
"Attribute2Image: Conditional Image Generation from Visual Attributes", Xinchen Yan et al., Computer Science and Engineering, University of Michigan, Ann Arbor, USA {xcyan,honglak}@umich.edu, Adobe Research, San Francisco, USA, jimyang@adobe.com, NEC Labs, Cupertino, USA, ksohn@nec-labs.com, Springer International Publishing AG 2016, B. Leibe et al. (Eds.): ECCV 2016, Part IV, LNCS 9908, pp. 776-791, 2016, DOI:10.1007/978-3-319-46493-0_47 (16 pages).

\* cited by examiner

TRAINING DEVICE AND TRAINING METHOD FOR TRAINING IMAGE PROCESSING DEVICE

INCORPORATION BY REFERENCE

The disclosure of Chinese Patent Application No. 201611160001.8 filed on Dec. 15, 2016 and entitled "TRAINING DEVICE AND TRAINING METHOD FOR TRAINING IMAGE PROCESSING DEVICE" including the specification, drawings and abstract is incorporated herein by reference in its entirety.

TECHNICAL FIELD

The disclosure relates to a training device and a training method for training an image processing device, and a corresponding image processing device.

BACKGROUND ART

Moderate modifications for a face image are often needed to make the face image have a specific feature or to remove a specific feature from the face image, that is, to manipulate a face feature. For example, glasses are removed from a wearing-glasses face image of a captured person or glasses are added to a captured person in a face image. The modifications made for the face image shall avoid as far as possible from producing influences upon other areas of the face image which do not relate to the specific feature, so as to maintain visual fidelity of the face image.

SUMMARY OF THE INVENTION

Hereinafter, a brief summary of the disclosure will be given to provide a basic understanding of some aspects of the disclosure. It should be understood that the summary is not an exhaustive summary of the disclosure; it does not intend to define a key or important part of the disclosure, nor does it intend to limit the scope of the disclosure. The object of the summary is only to briefly present some concepts, which serves as a preamble of the detailed description that follows.

An object of the disclosure is to provide a training device and a training method for training an image processing device. The image processing device trained by the training device and the training method according to the disclosure may realize manipulation for a specific feature in an image while maintaining high visual fidelity. The image processing device trained by the training device and the training method according to the disclosure is particularly applicable to face image processing to realize manipulation for a specific feature in a face image.

To achieve the object of the disclosure, according to one aspect of the present application, there is provided a raining device for training an image processing device, for training a first image processing unit and a second image processing unit, the training device comprising: a training unit configured to input a first realistic image without a specific feature into the first image processing unit to generate a first generated image with the specific feature through first image processing by the first image processing unit, and to input a second realistic image with the specific feature into the second image processing unit to generate a second generated image without the specific feature through second image processing by the second image processing unit; and a classifying unit configured to be capable of performing classification processing to discriminate realistic images including the first realistic image and the second realistic image and generated images including the first generated image and the second generated image, wherein the training unit is further configured to: perform first training processing of training the classifying unit based on the realistic images and the generated images; and perform second training processing of training the first image processing unit and the second image processing unit based on a training result of the first training processing to reduce classification accuracy of the classifying unit.

According to another aspect of the disclosure, there is provided a training method for training an image processing device, for training a first image processing unit and a second image processing unit, the training method comprising: inputting a first realistic image without a specific feature into the first image processing unit to generate a first generated image with the specific feature through first image processing by the first image processing unit; inputting a second realistic image with the specific feature into the second image processing unit to generate a second generated image without the specific feature through second image processing by the second image processing unit; performing classification processing to discriminate realistic images including the first realistic image and the second realistic image and generated images including the first generated image and the second generated image, and performing first training processing of training the classifying unit based on the realistic images and the generated images, and performing second training processing of training the first image processing unit and the second image processing unit based on a training result of the first training processing to reduce classification accuracy of the classifying unit.

According to still another aspect of the disclosure, there is further provided an image processing device obtained through training performed by the training device and the training method according to the disclosure.

According to yet another aspect of the disclosure, there is further provided a computer program capable of implementing the above training method. In addition, there is further provided a computer program product in the form of at least computer readable medium, on which a computer program code for implementing the above training method is recorded.

With the image processing device trained by the training technique according to the disclosure, it is made possible to add a specific feature to an image or to remove a specific feature from an image. Manipulation for a specific feature of an image may be realized while keeping other features of the image essentially unchanged, that is, maintaining high visual fidelity. An image obtained by the image processing device trained by the training technique according to the disclosure may be used as added image data or pre-processed image data for other specific applications.

In particular, by the image processing device trained by the training technique according to the disclosure, it is made possible to realize manipulation for a specific feature in a face image while maintaining high visual fidelity of the image.

BRIEF DESCRIPTION OF THE DRAWINGS

The above and other objects, features and advantages of the disclosure will be understood more easily with reference to embodiments of the disclosure which are described in combination with the appended drawings below. In the appended drawings.

DETAILED DESCRIPTION OF EMBODIMENTS

Hereinafter, exemplary embodiments of the disclosure will be described combined with the appended drawings. For the sake of clarity and conciseness, the specification does not describe all features of actual embodiments. However, it should be understood that in developing any such actual embodiment, many decisions specific to the embodiments may be made, so as to achieve specific objects of a developer; besides, these decisions possibly will vary as the embodiments differ.

It should also be noted herein that, to avoid the disclosure from being obscured due to unnecessary details, only those components closely related to the solution according to the disclosure are shown in the appended drawings, while omitting other details not closely related to the disclosure.

Figure 1:
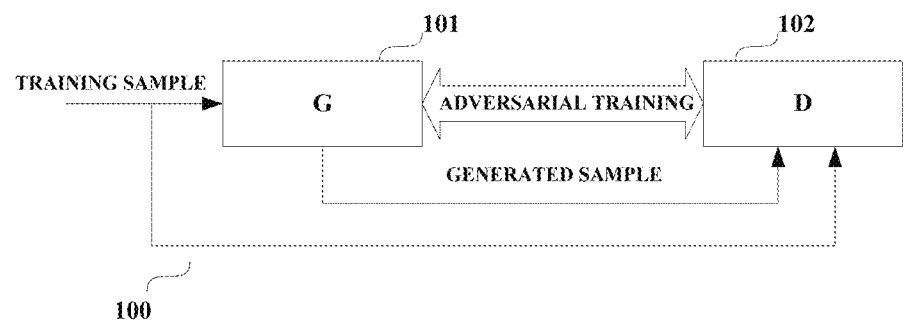
FIG. 1 is a schematic structural block diagram showing an adversarial training device according to the prior art.

The concept of the training technique according to the disclosure is based on the adversarial training (also referred to as adversarial learning) technique in the field of machine learning. FIG. 1 is a schematic structural block diagram showing an adversarial training device 100 according to the prior art.

As shown in FIG. 1, the adversarial training device 100 comprises a generative module G 101 and a discriminative model D 102. The generative module G 101 acquires training samples as realistic data and generates generated samples. The discriminative model D 102 may be regarded as a binary classifier, which may discriminate training samples and generated samples.

In a training process of the adversarial training device 100, firstly, the discriminative model D 102 is trained using the training samples and the generated samples generated by the generative model G 101 based on the training samples. Subsequently, the generative model G 101 is trained based on a training result for the discriminative model D 102. The generative model G 101 and the discriminative model D 102 are continued to be alternately trained following the above steps using new training samples. In other words, G 101 shall make its own output like the training samples as far as possible, and D 102 shall distinguish as far as possible conditions where samples are not the training samples. Usually, the training process ends when classification accuracy of the discriminative model D 102 reaches a stable state.

The disclosure proposes a training technique for training an image processing device. The image processing device trained by the training technique may realize manipulation for a specific feature of an image while maintaining high visual fidelity of the image.

Figure 2:
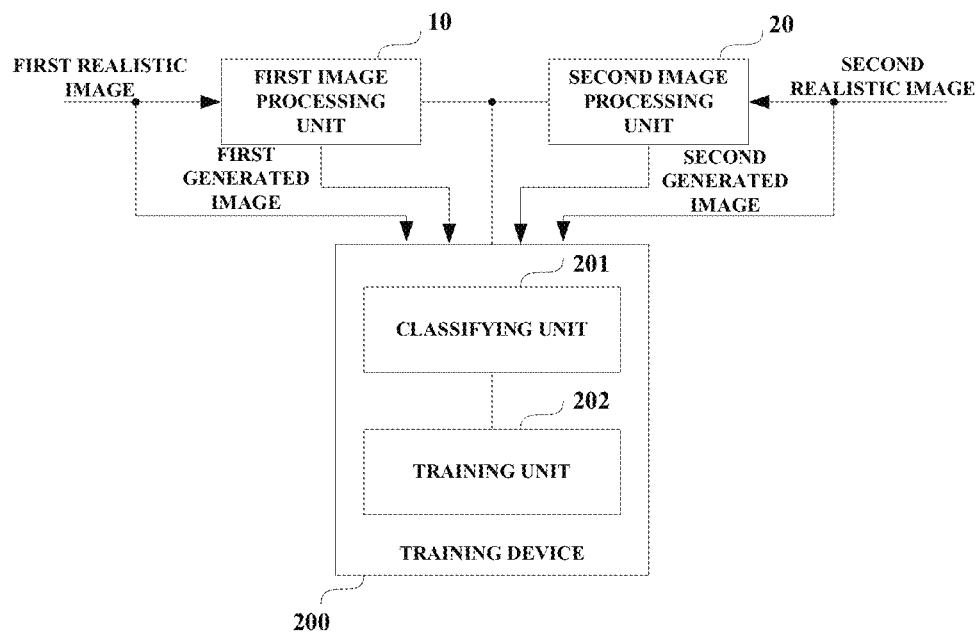
FIG. 2 is a schematic structural block diagram showing a training device according to an embodiment of the disclosure.
Figure 3:
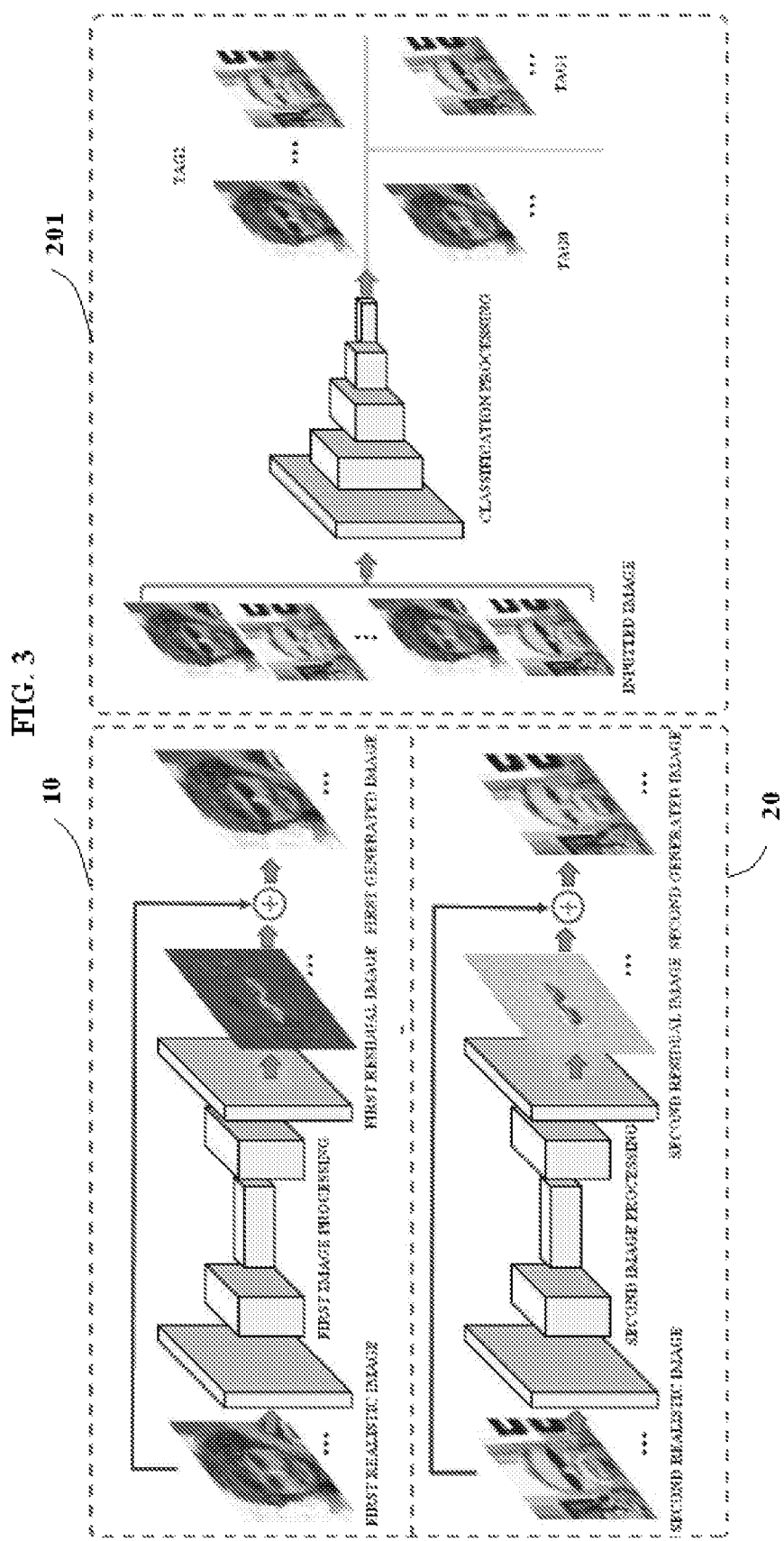
FIG. 3 is a schematic view showing training processing performed by the training device according to the embodiment of the disclosure.

FIG. 2 is a schematic structural block diagram showing a training device 200 according to an embodiment of the disclosure. FIG. 3 is a schematic view showing training processing performed by the training device 200 according to the embodiment of the disclosure.

The training device 200 is used for training a first image processing unit 10 and a second image processing unit 20. The training device 200 comprises a classifying unit 201 and a training unit 202. Detailed descriptions will be respectively made for the first image processing unit 10, the second image processing unit 20, the classifying unit 201 and the training unit 202 below.

<First Image Processing Unit 10 and Second Image Processing Unit 20>

The first image processing unit 10 may generate a first generated image with a specific feature based on a first realistic image without the specific feature by performing first image processing. The second image processing unit 20 may generate a second generated image without the specific feature based on a second realistic image with the specific feature by performing second image processing.

According to one embodiment of the disclosure, the first realistic image and the second realistic image may be for example face images, and the specific feature may be for example mustache, glasses, smile, etc.

As a specific example, as shown in FIG. 3, the first realistic image inputted to the first image processing unit 10 is a not-wearing-glasses face image, and the first image processing unit 10 adds glasses in the first realistic image by performing the first image processing, to generate a wearing-glasses face image as the first generated image.

Correspondingly, as shown in FIG. 3, the second realistic image inputted to the second image processing unit 20 is a wearing-glasses face image, and the second image processing unit 20 removes glasses from the second realistic image by performing the second image processing, to generate a not-wearing-glasses face image as the second generated image.

The first realistic image and the second realistic image, before being inputted to the first image processing unit 10 and the second image processing unit 20, have been classified as a realistic image with the specific feature and a realistic image without the specific feature. The object of training the first image processing unit 10 and the second image processing unit 20 by the training device 200 is to realize manipulation for the specific feature in the realistic images, for example to add the specific feature in the realistic images or to remove the specific feature from the realistic images, while causing the generated images generated by the first image processing unit 10 and the second image processing unit 20 to have high visual fidelity.

Note that according to the disclosure, face images as the first realistic image and the second realistic image are not particularly limited. In other words, these face images may be arbitrary, with only a requirement of determining whether they have the specific feature such as glasses before they are inputted to the first image processing unit 10 and the second image processing unit 20. Moreover, it is not necessarily required that the realistic image without the specific feature and the realistic image with the specific feature exist in a pair. For example, a person in a wearing-glasses face image may be a person different from a person in a not-wearing-glasses face image.

According to the embodiment of the disclosure, the first image processing performed by the first image processing unit 10 may be processing of generating a first residual image, and the first generated image is a sum of the first realistic image and the first residual image. According to the embodiment of the disclosure, the first residual image may be related only to the specific feature, for example only to glasses in the face image. The first residual image is a difference between the first realistic image without the specific feature and the first generated image with the specific feature.

Correspondingly, the second image processing performed by the second image processing unit 20 may be processing of generating a second residual image, and the second generated image is a sum of the second realistic image and the second residual image. The second residual image may be related only to the specific feature, for example only to glasses in the face image. The second residual image is a difference between the second realistic image with the specific feature and the second generated image without the specific feature.

The first residual image may be understood as being complementary with the second residual image, such that one is used for adding the specific feature while the other is used for removing the specific feature.

For example, as shown in FIG. 3, the first residual image may be an image for adding glasses in the face image. Thus as shown in FIG. 3, the wearing-glasses face image as the first generated image may be obtained by adding the first residual image about glasses and the not-wearing-glasses face image as the first realistic image. On the contrary, the second residual image may be an image for removing glasses from the face image. Thus as shown in FIG. 3, the not-wearing-glasses face image as the second generated image may be obtained by adding the second residual image about glasses and the wearing-glasses face image as the second realistic image.

An advantage of the first residual image and the second residual image used in the first image processing unit 10 and the second image processing unit 20 is making it possible to limit the processing on the first realistic image and the second realistic image only to areas related to the specific feature. For example, as shown in FIG. 3, the first residual image and the second residual image are related only to glasses, that is, only to areas around eyes in the face image, so the first image processing and the second image processing only concern local areas around eyes in the face image. In this way, with use of the first residual image and the second residual image, face image manipulation for the specific feature may be realized while keeping other features of the face image essentially unchanged, that is, maintaining high visual fidelity, so as to save calculation resources.

According to the embodiment of the disclosure, the first image processing by the first image processing unit 10 and the second image processing by the second image processing unit 20 may be implemented based on a Convolutional Neural Network (CNN). Specifically, the first residual image in the first image processing unit 10 and the second residual image in the second image processing unit 20 may be generated through the CNN.

The CNN will be briefly described below. The CNN is a feedforward neural network, which is widely applied to the field of image and speech processing. The CNN is based on three important features, that is, receptive field, weight sharing, and pooling.

The CNN assumes that each neuro only has a connection relation with and produces influences upon neurons in an adjacent area. The receptive field represents a size of the adjacent area. In addition, the CNN assumes that a connection weight between neuros in a certain area may also be applied to other areas, which is referred to as weight sharing. The pooling of the CNN refers to a dimension reduction operation performed based on aggregate statistics when the CNN is used for solving a classification problem.

In a case where the first image processing and the second image processing are implemented using the CNN, training for the first image processing unit 10 and the second image processing unit 20 is training for the CNN that implements the first image processing and the second image processing.

As shown in FIG. 3, for example, a CNN with a convolutional-deconvolutional structure may be used to implement the first image processing performed by the first image processing unit 10 and the second image processing performed by the second image processing unit 20, that is, to generate the first residual image and the second residual image.

According to the embodiment of the disclosure, in the case where the first image processing and the second image processing by the first image processing unit 10 and the second image processing unit 20 are implemented using the CNN, at least one of a receptive field, a connection weight and a pooling function of the CNN that implements the first image processing and the second image processing may be adjusted when the first image processing unit 10 and the second image processing unit 20 are trained.

It should be noted herein that, in the case where the first image processing and the second image processing are implemented using the CNN, the training process for the first image processing unit 10 and the second image processing unit 20 may be regarded as a process of adjusting the first residual image and the second residual image, and the object of the training process is to generate the first generated image and the second generated image having high visual fidelity.

<Classifying Unit 201>

The classifying unit 201 is capable of performing classification processing to discriminate realistic images including the first realistic image and the second realistic image and generated images including the first generated image and the second generated image.

In other words, with respect to the example as shown in FIG. 3, the classifying unit 201 may discriminate realistic face images as the first realistic image and the second realistic image, and face images as the first generated image and the second generated image which are generated by the first image processing unit 10 and the second image processing unit 20.

According to the embodiment of the disclosure, the classification processing performed by the classifying unit 201 may also be implemented based on a CNN. The CNN for implementing the classification processing may have the convolutional structure as shown in FIG. 3. In this case, the CNN for implementing the classification processing by the classifying unit 201 may be regarded as a classifier.

For example, it is possible to set the realistic images including the first realistic image and the second realistic image to have a tag 0, and the generated images including the first generated image and the second generated image which are generated by the first image processing unit 10 and the second image processing unit 20 to have a tag 1. When images including the first realistic image, the second realistic image, the first generated image and the second generated image are inputted to the classifying unit 201, the classifying unit 201 may output 0 or 1 to represent a discrimination result as to whether the inputted images are the realistic images or are the generated images generated by the first image processing unit 10 and the second image processing unit 20.

According to the embodiment of the disclosure, the classifying unit 201 alternately performs training for the first image processing unit 10 and the second image processing unit 20 and training for the classifying unit 201.

The object of performing training for the classifying unit 201 is to make the classifying unit 201 discriminate, as accurately as possible, the realistic images including the first realistic image and the second realistic image, and the generated images including the first generated image and the second generated image which are generated by the first image processing unit 10 and the second image processing unit 20.

According to the embodiment of the disclosure, in a case where the classification processing by the classifying unit 201 is implemented using the CNN, at least one of a receptive field, a connection weight and a pooling function of the CNN that implements the classification processing may be adjusted when the classifying unit 201 is trained.

According to another embodiment of the disclosure, the classifying unit 201 may further be capable of discriminating the first realistic image and the second realistic image.

For example, in this case, it is possible to set the first realistic image without the specific feature to have a tag 0, the second realistic image with the specific feature to have a tag 1, and the first generated image and the second generated image which are generated by the first image processing unit 10 and the second image processing unit 20 to have a tag 2.

In this case, as depicted in FIG. 3, the classifying unit 201 may output 0, 1 or 2 to discriminate whether the inputted image is the first realistic image without the specific feature, or is the second realistic image with the specific feature or is the first generated image or the second generated image which is generated by the first image processing unit 10 or the second image processing unit 20.

<Training Unit 202>

The training unit 202 may perform first training processing of training the classifying unit 201 based on the first realistic image and the second realistic image, and the first generated image and the second generated image which are generated by the first image processing unit 10 and the second image processing unit 20, and may perform second training processing of training the first image processing unit 10 and the second image processing unit 20 based on a training result of the first training processing to reduce classification accuracy of the classifying unit 201.

The concept of the training process performed by the training unit 202 is based on an adversarial technique. In particular, the first image processing unit 10 and the second image processing unit 20 serve as one party, the classifying unit 201 serves as the other party, and the two parties perform adversarial training. On the one hand, the object of the first training processing of training the classifying unit 201 based on the realistic images and the generated images is to enable the classifying unit 201 to accurately discriminate the realistic images and the generated images.

On the contrary, the object of performing the second training processing on the first image processing of the first image processing unit 10 and the second image processing of the second image processing unit 20 based on the training result of the first training processing on the classifying unit 201 is to disable the classifying unit 201 to discriminate the realistic images and the generated images, as far as possible.

According to the embodiment of the disclosure, the training unit 202 may alternately perform the first training processing and the second training processing until classification accuracy of the classifying unit 201 is stable.

Specifically, in the training process, firstly, the first realistic image and the second realistic image are respectively inputted to the first image processing unit 10 and the second image processing unit 20 to generate the first generated image and the second generated image, and subsequently, the first training processing on the classifying unit 201 is performed using the first realistic image and the second realistic image, and the first generated image and the second generated image.

In the case where the classifying unit 201 is implemented using the CNN, training the classifying unit 201 is performed by adjusting at least one of a receptive field, a connection weight and a pooling function of the CNN that implements the classification processing by the classifying unit 201, and the object of training is to increase classification accuracy of the classifying unit 201 as far as possible, that is, to cause a loss function of the CNN that implements the classifying unit 201 to be minimized.

Subsequently, the second training processing on the first image processing unit 10 and the second image processing unit 20 is performed based on the training result of the first training processing on the classifying unit 201.

In the case where the first image processing unit 10, the second image processing unit 20 and the classifying unit 201 are implemented using the CNN, the principle of performing the second training processing on the first image processing unit 10 and the second image processing unit 20 based on the training result of the first training processing is: the first image processing unit 10 and the second image processing unit 20 do not have a loss function, while the classifying unit 201 has a loss function, and the loss function of the classifying unit 201 reflects classification accuracy of the classifying unit 201. In an ideal case, the loss function is zero, and correspondingly the classification accuracy is the highest.

Thus, the first image processing unit 10 and the second image processing unit 20 may be trained based on the training result of the classifying unit 201 on the basis of a gradient descent method. Specifically, since the loss function of the classifying unit 201 contains contributions provided by the generated image as the input to the classifying unit 201, a gradient of the loss function of the classifying unit 201 with respect to the generated image may be calculated, and the first image processing unit 10 and the second image processing unit 20 are trained according to the gradient.

In the case where the first image processing by the first image processing unit 10 and the second image processing by the second image processing unit 20 are implemented using the CNN, training the first image processing unit 10 and the second image processing unit 20 is performed by adjusting at least one of a receptive field, a connection weight and a pooling function of the CNN that implements the first image processing and the second image processing, and the object of training is to decrease classification accuracy of the classifying unit 201 as far as possible, that is, to cause a loss function of the CNN that implements the classification processing to become greater.

In this regard, in the case where the first image processing unit 10, the second image processing unit 20 and the classifying unit 201 are implemented using the CNN, all the training for the CNNs that implement the first image processing, the second image processing and the classification processing are performed based on the loss function of the CNN that implements the classification processing.

The above training process may be regarded as one training step, and subsequently, the above training step is repeated using new first realistic image and second realistic image.

Note that the realistic images including the first realistic image and the second realistic image may be cyclically used to train the first image processing unit 10, the second image processing unit 20 and the classifying unit 201. For example, the realistic images as the training samples may be divided into several groups; starting from a first group of the realistic images, a new group of the realistic images are used each time the training step is performed, until the realistic images are used up. Thereafter, the above training process may be repeated again starting from the first group of the realistic images, until an expected training effect is achieved.

A condition for judging whether the training is completed is determined according to specific applications. For example, at the start of the training, since the first image processing unit 10 and the second image processing unit 20 have not been trained, an obtained difference between the generated image and the realistic image is greater, so the first training processing on the classifying unit 201 may achieve a better training effect, that is, has higher classification accuracy. As the second training processing on the first image processing unit 10 and the second image processing unit 20 goes on, better generated images may be obtained, so classification accuracy of the classifying unit 201 will decrease along therewith. Usually, after multiple times of iterations of the above training step, classification accuracy of the classifying unit 201 will reach a stable state, and at this time it may be regarded that the training ends. For example, after the end of each training step, current classification accuracy may be compared with classification accuracy after the end of previous several training steps, and if a difference therebetween is within a predetermined range, the training may be ended.

In addition, a specific number of times of the training may also be artificially set.

According to another embodiment of the disclosure, the first image processing unit 10 may further generate a third generated image based on the second generated image by performing the first image processing, and the second image processing unit 20 may further generate a fourth generated image based on the first generated image by performing the second image processing. The training unit 202 may further perform third training processing of training the first image processing unit 10 and the second image processing unit 20 using the first realistic image, the second realistic image, the third generated image and the fourth generated image. The third training processing may also be referred to as dual learning.

Figure 4:
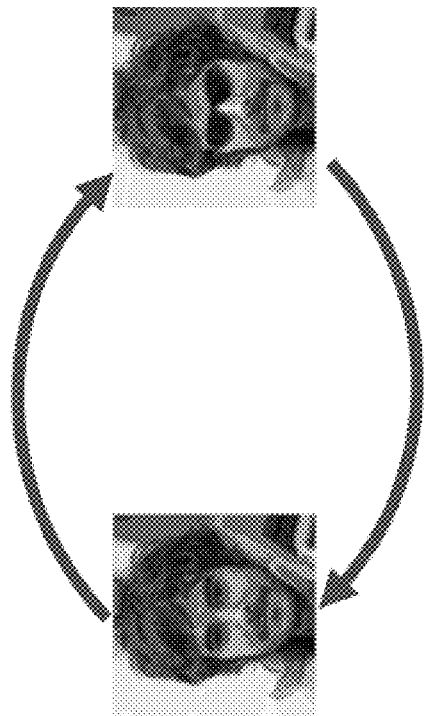
FIG. 4 is a schematic view showing dual leaning according to an embodiment of the disclosure.
Figure 4:
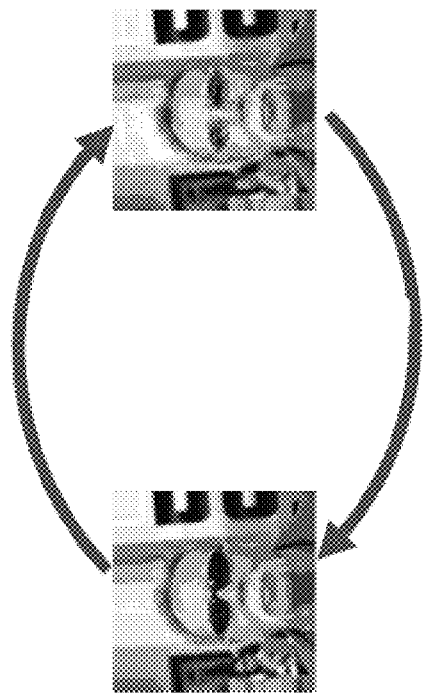

FIG. 4 is a schematic view showing dual leaning according to an embodiment of the disclosure.

The second generated image is an image without the specific feature, so the specific feature is again re-added in the second generated image through the first image processing by the first image processing unit, so as to obtain the third generated image with the specific feature. Similarly, the first generated image is an image with the specific feature, so the specific feature is again re-removed from the first generated image through the second image processing by the second image processing unit, so as to obtain the fourth generated image without the specific feature.

For example, as shown in FIG. 4, the wearing-glasses face image generated by the first image processing unit 10 is inputted to the second image processing unit 20 to generate a not-wearing-glasses face image, and the not-wearing-glasses face image generated by the second image processing unit 20 is inputted to the first image processing unit 10 to generate a wearing-glasses face image.

In an ideal case, the third generated image shall be identical to the second realistic image, and the fourth generated image shall be identical to the first realistic image. Thus, according to one embodiment of the disclosure, the third training processing trains the first image processing unit 10 and the second image processing unit 20 using a difference between the first realistic image and the fourth generated image and a difference between the second realistic image and the third generated image.

According to one embodiment of the disclosure, the training unit 202 may sequentially perform the first training processing, the second training processing and the third training processing repeatedly. However, the disclosure is not limited thereto. The training unit 202 may also perform the third training processing once after performing the first training processing and the second training processing for several times. Or, the first and second training processing may be combined with the third training processing for any number of times and in any order.

By training the first image processing unit 10 and the second image processing unit 20 using the first realistic image, the second realistic image, the third generated image and the fourth generated image, it is made possible to increase a training speed of the first image processing unit 10 and the second image processing unit 20 and improve a processing effect of the first image processing and the second image processing.

Through the above training process by the training device 200, the first image processing unit 10 and the second image processing unit 20 may realize manipulation for the specific feature while maintaining high visual fidelity. According to the embodiments of the disclosure, the first image processing unit 10 or the second image processing unit 20 which has been trained may constitute the image processing device for performing manipulation for the specific feature in the image.

Figure 5:
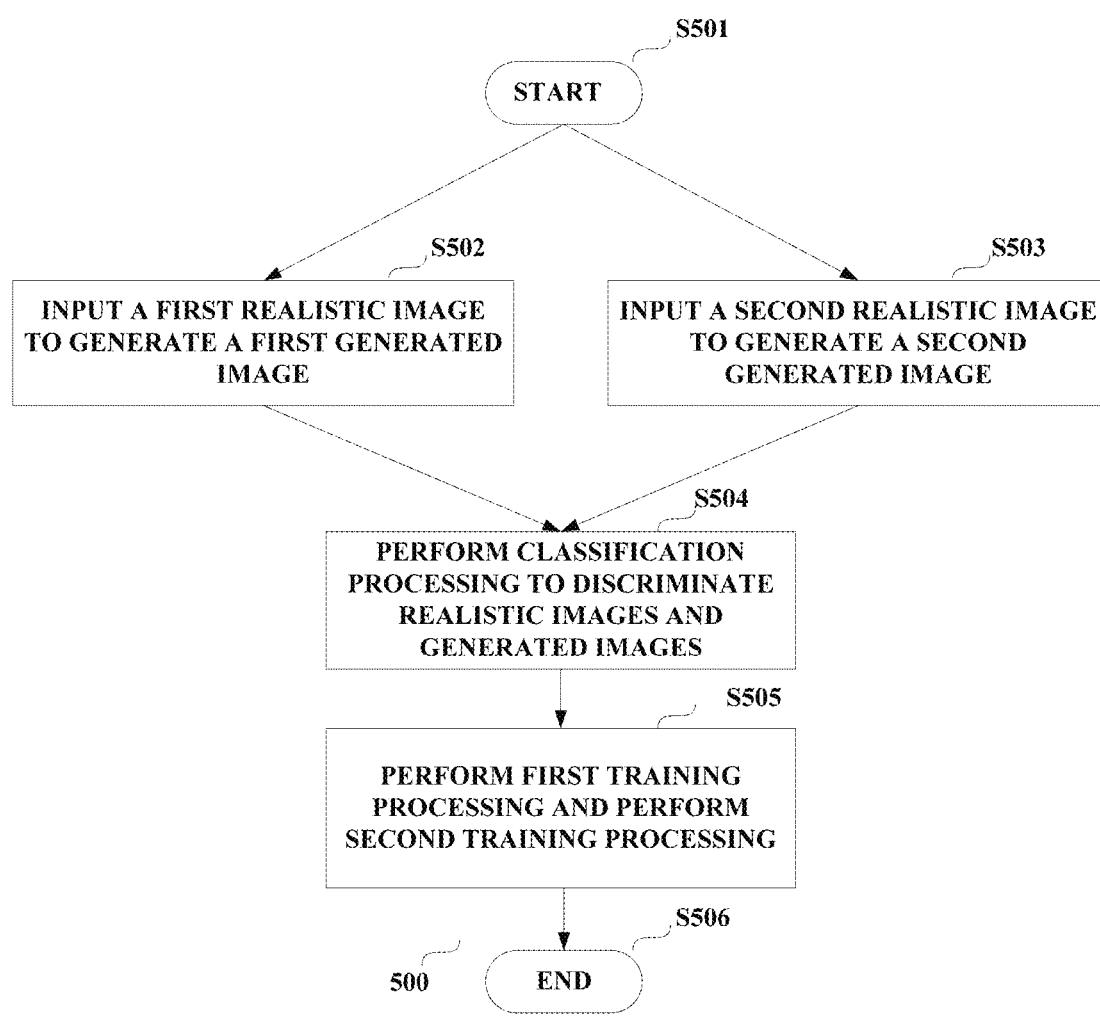
FIG. 5 is a flowchart showing a training method according to an embodiment of the disclosure.

A training method according to an embodiment of the disclosure will be described in accordance with FIG. 5 below. FIG. 5 is a flowchart showing a training method 500 according to an embodiment of the disclosure.

The training method 500 as shown in FIG. 5 starts from step S501. Subsequently in step S502, a first realistic image without a specific feature is inputted into the first image processing unit to generate a first generated image with the specific feature through first image processing by the first image processing unit. For example, step S502 may be implemented by performing the processing by the first processing unit 10 as described for example with reference to FIG. 2, and descriptions thereof are omitted herein.

Step 503 is performed in parallel with step S502. In step S503, a second realistic image with the specific feature is inputted into the second image processing unit to generate a second generated image without the specific feature through second image processing by the second image processing unit. For example, step S503 may be implemented by performing the processing by the second processing unit 20 as described for example with reference to FIG. 2, and descriptions thereof are omitted herein.

Subsequently, the method 500 proceeds to step S504. In step S504, classification processing is performed to discriminate realistic images including the first realistic image and the second realistic image and generated images including the first generated image and the second generated image. For example, step S504 may be implemented by performing the processing by the classifying unit 201 as described for example with reference to FIG. 2, and descriptions thereof are omitted herein.

Subsequently, the method 500 proceeds to step S505. In step S505, first training processing of training the classifying unit based on the realistic images and the generated images is performed, and second training processing of training the first image processing unit and the second image processing unit based on a training result of the first training processing to reduce classification accuracy of the classifying unit is performed. For example, step S505 may be implemented by performing the processing by the training unit 202 as described for example with reference to FIG. 2, and descriptions thereof are omitted herein.

In addition, according to one embodiment of the disclosure, in step S505, the first training processing and the second training processing may also be alternately performed until the classification accuracy of the classifying unit is stable.

In addition, according to one embodiment of the disclosure, in step S505, third training processing of training the first image processing unit and the second image processing unit using the first realistic image, the second realistic image, the third generated image and the fourth generated image as described above with reference to FIG. 4 may also be performed.

The image processing method 500 ends with step S506.

The image processing method 500 according to the embodiment of the disclosure is not limited to be performed in the temporal order as described in the specification, but may also be performed sequentially, in parallel or independently in other temporal orders. Thus, the order of performing the image processing method as described in the specification does not constitute a limitation to the technical scope of the disclosure.

For example, step S502 may be performed either prior to step S503 or after step S503.

Figure 6:
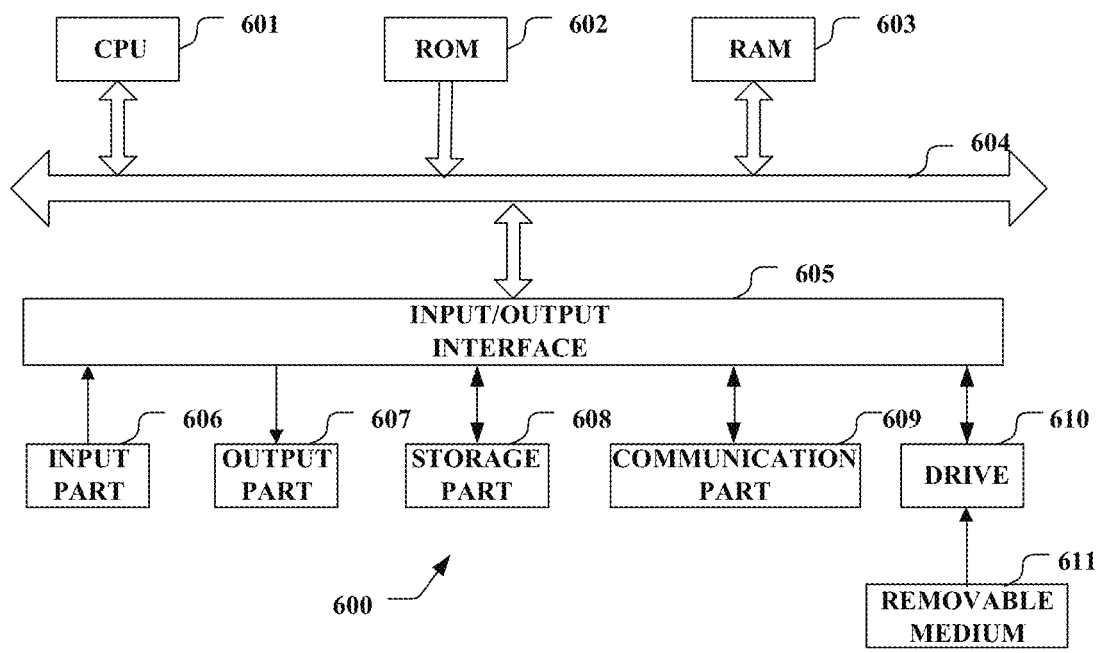
FIG. 6 is a structural diagram showing a general-purpose machine that may be used for implementing the training method according to the embodiment of the disclosure.

FIG. 6 is a structural diagram showing a general-purpose machine 600 that may be used for implementing the training method 500 according to the embodiment of the disclosure in FIG. 5. The general-purpose machine 600 may be for example a computer system. It should be noted that the general-purpose machine 600 is only an example but does not suggest a limitation to a usage range or a function of the method and the device according to the disclosure. The general-purpose machine 600 shall not be construed as having a dependence upon or a demand for any assembly or combination thereof as shown in the above training device or image processing method, either.

In FIG. 6, a central processing unit (CPU) 601 executes various processing according to a program stored in a read-only memory (ROM) 602 or a program loaded from a storage part 608 to a random access memory (RAM) 603. In the RAM 603, data needed when the CPU 601 executes various processing and the like are also stored according to requirements. The CPU 601, the ROM 602 and the RAM 603 are connected to each other via a bus 604. An input/output interface 605 is also connected to the bus 604.

The following components are also connected to the input/output interface 605: an input part 606 (including a keyboard, a mouse and the like); an output part 607 (including a display, such as a Cathode Ray Tube (CRT), a Liquid Crystal Display (LCD) and the like, as well as a loudspeaker and the like); the storage part 608 (including a hard disc and the like); and a communication part 609 (including a network interface card such as an LAN card, a modem and so on). The communication part 609 performs communication processing via a network such as the Internet. According to requirements, a drive 610 may also be connected to the input/output interface 605. A removable medium 611 such as a magnetic disc, an optical disc, a magnetic optical disc, a semiconductor memory and the like may be installed on the drive 610 according to requirements, such that a computer program read therefrom is installed in the storage part 608 according to requirements.

In the case of carrying out the foregoing series of processing by software, programs constituting the software are installed from a network such as the Internet or a storage medium such as the removable medium 611.

Those skilled in the art should appreciate that such a storage medium is not limited to the removable medium 611 storing therein a program and distributed separately from the apparatus to provide the program to a user as shown in FIG. 6. Examples of the removable medium 611 include a magnetic disc (including floppy disc), a compact disc (including compact disc read-only memory (CD-ROM) and digital versatile disc (DVD), a magneto optical disc (including mini disc (MD) (registered trademark)), and a semiconductor memory. Or, the storage medium may be hard discs and the like included in the ROM 602 and the storage part 608, in which programs are stored and which are distributed concurrently with the apparatus including them to users.

In addition, the disclosure further proposes a program product storing therein a machine readable instruction code that, when read and executed by a machine, may implement the above image processing method according to the disclosure. Correspondingly, the aforementioned various storage media for carrying such a program product are also included in the disclosure.

In the forgoing descriptions of the specific embodiments of the disclosure, the image processing technique according to the disclosure is described based on the specific application of face image processing. However, the image processing technique according to the disclosure is not limited to the face image processing. Obviously, on the basis of the contents of the disclosure, those skilled in the art may envisage applying the image processing technique according to the disclosure to implementation solutions in other image processing fields.

It should be emphasized that when used in the text, the term "comprise/include" refers to existence of features, elements, steps or assemblies, but does not exclude existence or addition of one or more other features, elements, steps or assemblies. The terms "first", "second" and the like which relate to ordinal numbers do not represent an implementation order or an importance degree of features, elements, steps or assemblies defined by these terms, but are only used to perform identification among these features, elements, steps or assemblies for the sake of clarity of descriptions.

In conclusion, in the embodiments of the disclosure, the disclosure provides the following solutions, but is not limited thereto:

Solution 1: A training device for training an image processing device, for training a first image processing unit and a second image processing unit, the training device comprising:

a training unit configured to input a first realistic image without a specific feature into the first image processing unit to generate a first generated image with the specific feature through first image processing by the first image processing unit, and to input a second realistic image with the specific feature into the second image processing unit to generate a second generated image without the specific feature through second image processing by the second image processing unit; and a classifying unit configured to be capable of performing classification processing to discriminate realistic images including the first realistic image and the second realistic image and generated images including the first generated image and the second generated image, wherein the training unit is further configured to:

perform first training processing of training the classifying unit based on the realistic images and the generated images; and perform second training processing of training the first image processing unit and the second image processing unit based on a training result of the first training processing to reduce classification accuracy of the classifying unit.

Solution 2: The training device according to Solution 1, wherein the training unit is further configured to alternately perform the first training processing and the second training processing until the classification accuracy of the classifying unit is stable.

Solution 3: The training device according to solution 1, wherein the first image processing is processing of generating a first residual image, the first generated image is a sum of the first realistic image and the first residual image, and the second image processing is processing of generating a second residual image, the second generated image is a sum of the second realistic image and the second residual image.

Solution 4: The training device according to solution 3, wherein the first residual image and the second residual image are related only to the specific feature.

Solution 5: The training device according to Solution 1, wherein the classifying unit is further configured to be capable of discriminating the first realistic image and the second realistic image.

Solution 6: The training device according to Solution 1, wherein the first image processing unit is further configured to generate a third generated image based on the second generated image by performing the first image processing, the second image processing unit is further configured to generate a fourth generated image based on the first generated image by performing the second image processing, the training unit is further configured to perform third training processing of training the first image processing unit and the second image processing unit using the first realistic image, the second realistic image, the third generated image and the fourth generated image.

Solution 7: The training device according to Solution 6, wherein the classifying unit is further configured to alternately perform the first training processing, the second training processing and the third training processing until the classification accuracy of the classifying unit is stable.

Solution 8: The training device according to Solution 6, wherein the third training processing trains the first image processing unit and the second image processing unit using a difference between the first realistic image and the fourth generated image and a difference between the second realistic image and the third generated image.

Solution 9: The training device according to Solution 1, wherein the first image processing and the second image processing are implemented through a convolutional neural network, and the training for the first image processing unit and the second image processing unit is implemented by adjusting at least one of a receptive field, a connection weight and a pooling function of the convolutional neural network.

Solution 10: The training device according to Solution 1, wherein the classification processing is implemented through a convolutional neural network, and the training for the classifying unit is implemented by adjusting at least one of a receptive field, a connection weight and a pooling function of the convolutional neural network.

Solution 11: The training device according to Solution 1, wherein the first realistic image and the second realistic image are face images, and the specific feature is at least one of mustache, glasses, and smile.

Solution 12: A training method for training an image processing device, for training a first image processing unit and a second image processing unit, the training method comprising:

inputting a first realistic image without a specific feature into the first image processing unit to generate a first generated image with the specific feature through first image processing by the first image processing unit;

inputting a second realistic image with the specific feature into the second image processing unit to generate a second generated image without the specific feature through second image processing by the second image processing unit;

performing classification processing to discriminate realistic images including the first realistic image and the second realistic image and generated images including the first generated image and the second generated image, and performing first training processing of training the classifying unit based on the realistic images and the generated images, and performing second training processing of training the first image processing unit and the second image processing unit based on a training result of the first training processing to reduce classification accuracy of the classifying unit.

Solution 13: The training method according to Solution 12, wherein the first training processing and the second training processing are alternately performed until the classification accuracy of the classifying unit is stable.

Solution 14: The training method according to Solution 12, wherein the first image processing is processing of generating a first residual image, the first generated image is a sum of the first realistic image and the first residual image, and the second image processing is processing of generating a second residual image, the second generated image is a sum of the second realistic image and the second residual image.

Solution 15: The training method according to Solution 14, wherein the first residual image and the second residual image are related only to the specific feature.

Solution 16: The training method according to Solution 12, wherein the classification processing is further capable of discriminating the first realistic image and the second realistic image.

Solution 17: The training method according to Solution 12, wherein the first image processing unit is further configured to generate a third generated image based on the second generated image by performing the first image processing, the second image processing unit is further configured to generate a fourth generated image based on the first generated image by performing the second image processing, the training method further comprises performing third training processing of training the first image processing unit and the second image processing unit using the first realistic image, the second realistic image, the third generated image and the fourth generated image.

Solution 18: The training method according to Solution 17, wherein the first training processing, the second training processing and the third training processing are alternately performed until the classification accuracy of the classifying unit is stable.

Solution 19: The training method according to Solution 17, wherein the third training processing trains the first image processing unit and the second image processing unit using a difference between the first realistic image and the fourth generated image and a difference between the second realistic image and the third generated image.

Solution 20: An image processing device composed of the first image processing unit or the second image processing unit according to any one of Solutions 1 to 11.

Although the disclosure has been disclosed above by describing the specific embodiments of the disclosure, it should be understood that those skilled in the art could design various modifications, improvements or equivalents for the disclosure within the spirit and scope of the appended claims. The modifications, improvements or equivalents shall also be regarded as being included within the scope of protection of the disclosure.

What is claimed is:

1. A training device to train a first image process and a second image process, the training device comprising:
    a memory; and
    a processor coupled to the memory and the processor is to,
        perform a training process to input a first realistic image without a specific feature into the first image process to generate a first generated image with the specific feature through first image processing, and to input a second realistic image with the specific feature into the second image process to generate a second generated image without the specific feature through second image processing; and
        perform a classification process to discriminate realistic images including the first realistic image and the second realistic image and generated images including the first generated image and the second generated image,
    wherein the training process is to,
        perform a first training process of training the classification process based on the realistic images and the generated images; and
        perform a second training process of training the first image process and the second image process based on a training result of the first training processing to reduce classification accuracy of the classification process, and
    wherein,
        the first image process is to generate a first residual image, the first generated image is a sum of the first realistic image and the first residual image, and the second image process is to generate a second residual image, the second generated image is a sum of the second realistic image and the second residual image.

2. The training device according to claim 1, wherein the training process is to alternately perform the first training process and the second training process until the classification accuracy of the classification process is stable.

3. The training device according to claim 1, wherein the first residual image and the second residual image are related only to the specific feature.

4. The training device according to claim 1, wherein the classification process is to discriminate the first realistic image and the second realistic image.

5. The training device according to claim 1, wherein the first image process is to generate a third generated image based on the second generated image, the second image process is to generate a fourth generated image based on the first generated image, the training process is to perform a third training process of training the first image process and the second image process using the first realistic image, the second realistic image, the third generated image and the fourth generated image.

6. The training device according to claim 5, wherein the classification process is to alternately perform the first training process, the second training processing and the third training process until the classification accuracy of the classification process is stable.

7. The training device according to claim 5, wherein the third training process trains the first image process and the second image process using a difference between the first realistic image and the fourth generated image and a difference between the second realistic image and the third generated image.

8. An image processing device comprising a memory, and a processor coupled to the memory and the processor is to implement the first image process and the second image process, according to claim 1.

9. A training method by a training device including a memory and a processor coupled to the memory, to train a first image process and a second image process of an image processing device, the training method comprising:
    by the training device,
        inputting a first realistic image without a specific feature into the first image process to generate a first residual image and to generate a first generated image with the specific feature through first image processing according to a sum of the first realistic image and the first residual image;
        inputting a second realistic image with the specific feature into the second image process to generate a second residual image and to generate a second generated image without the specific feature through second image processing according to a sum of the second realistic image and the second residual image;
        performing a classification processing to discriminate realistic images including the first realistic image and the second realistic image and generated images including the first generated image and the second generated image, and
        performing a first training process to train the classification process, based on the realistic images and the generated images, and performing a second training process to train the first image process and the second image process based on a training result of the first training process to reduce classification accuracy of the classification process.

* * * * *